May 26, 1925.
J. E. FOX
LOCK WASHER
Filed July 16, 1923
1,538,979
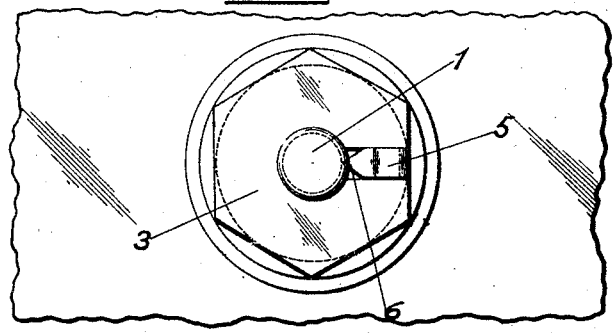
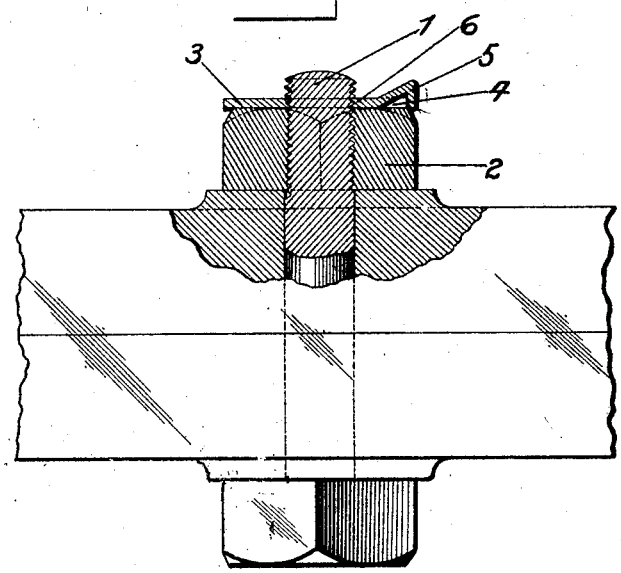
Inventor:
John E. Fox,
by Tippey & Kingland.
His Attorneys.

Patented May 26, 1925.

1,538,979

UNITED STATES PATENT OFFICE.

JOHN E. FOX, OF ST. LOUIS, MISSOURI.

LOCK WASHER.

Application filed July 16, 1923. Serial No. 651,732.

*To all whom it may concern:*

Be it known that I, JOHN E. FOX, a citizen of the United States, residing at St. Louis, Missouri, have invented a new and useful Lock Washer, of which the following is a specification.

This invention relates to lock washers.

An object of the invention is to provide an improved device adapted to be applied to a bolt at the outer side of the nut and to engage the bolt in a manner to prevent loosening of the nut.

In the drawing Fig. 1 is a plan view showing the device applied to a bolt.

Fig. 2 is a sectional view.

The threaded end of the bolt 1 has a nut 2 screwed thereon in the familiar manner, leaving the threaded portion of the bolt projecting beyond the nut.

The lock washer 3 has a hole therethrough to receive the threaded end of the bolt and may be screwed onto the bolt following the nut. Preferably the washer 3 conforms in shape to the shape of the nut permitting the same wrench to engage both the nut and the washer.

From the hole through the washer a notch 4 extends a distance toward one side edge of the washer; and the side edge of the washer toward which the notch 4 extends has a flexible tongue 5 formed integral therewith adapted to be bent over and downwardly into the notch 4. The end of the tongue 5 has a projecting blade 6 which, when the washer is in place, may be driven inwardly to form an indentation in the threads of the bolt and to remain seated in such indentation, thereby preventing the washer and the nut from working loose. The washer is made of appropriate metal so that the blade 6 will cut the indentation in the thread of the bolt to which it is applied as stated.

When it is desired to release the washer in order to remove the nut or for any other purpose, an implement may be engaged under the raised outer portion of the tongue 5 and sufficient force applied to bend the tongue 5 outwardly out of engagement with the bolt, leaving the washer and the nut free to be released from the bolt.

The device is an efficient and simple one for the purpose for which it is intended and may be economically manufactured in quantities.

What I claim and desire to secure by Letters Patent is:—

A detachable and replaceable lock washer comprising a body portion having a hole therethrough to receive the end of a bolt and having a notch therein extending from the hole toward one side edge, a relatively long bendable tongue integral with the outer side edge of the body portion beyond the end of said notch and in alinement with said notch and adapted to be bent over and downwardly in inverted relationship in which the inner end is in said notch and in engagement with the threads of the bolt and the outer portion near the edge of the body is raised and forms an engageable portion above the body for engagement in releasing the tongue from the bolt.

JOHN E. FOX.